July 10, 1956  M. E. PILLSBURY ET AL  2,753,830
LIGHT-REFLECTIVE WARNING SIGNALLING MEANS FOR CONVEYANCES
Filed April 1, 1955
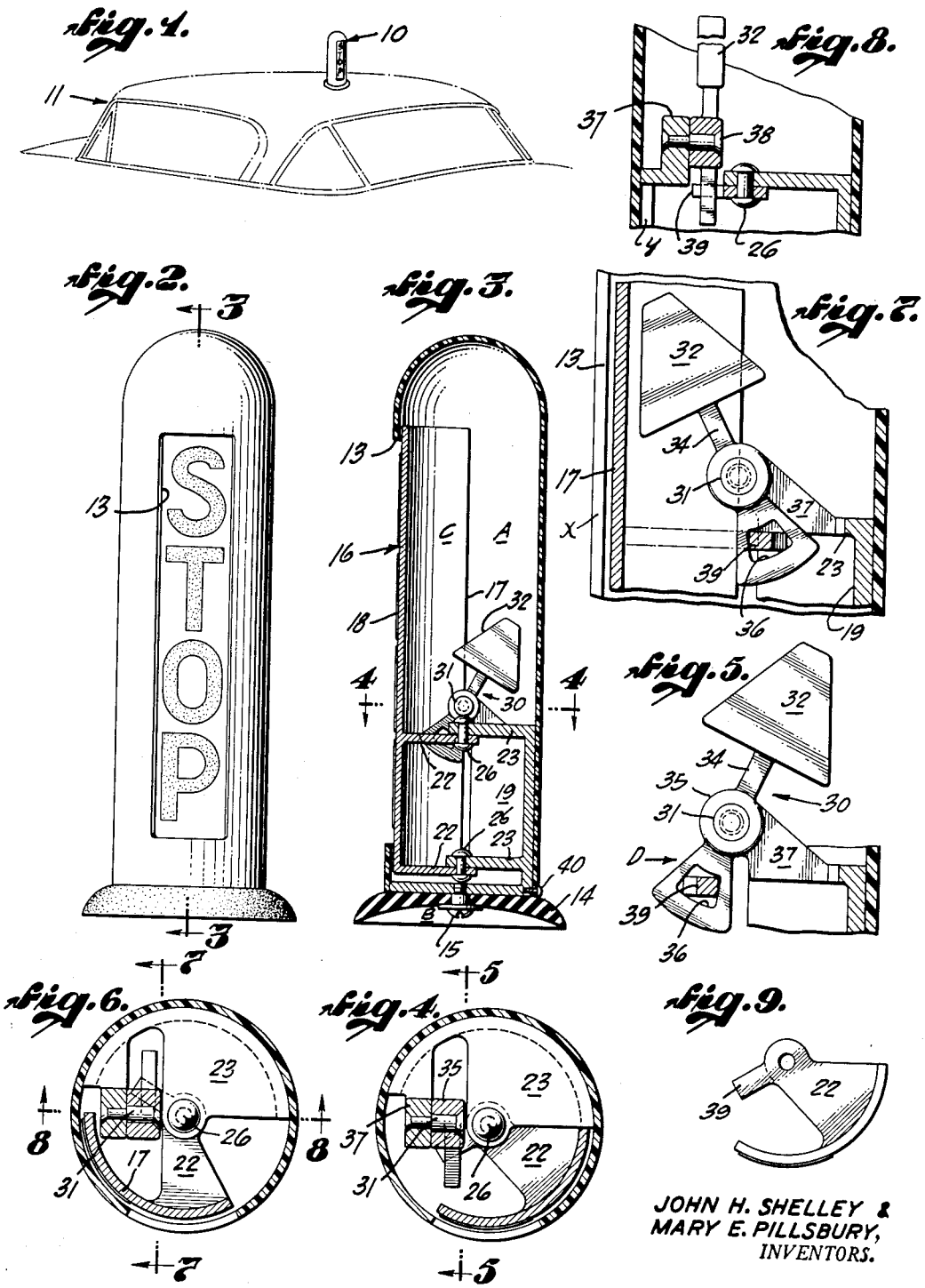
JOHN H. SHELLEY &
MARY E. PILLSBURY,
INVENTORS.
BY
Robert C. Rasche
ATTORNEY.

United States Patent Office

2,753,830
Patented July 10, 1956

2,753,830

LIGHT-REFLECTIVE WARNING SIGNALLING MEANS FOR CONVEYANCES

Mary E. Pillsbury and John H. Shelley, Sherman Oaks, Calif.; said Mary E. Pillsbury, assignor to Oliver C. Pillsbury, Sherman Oaks, Calif.

Application April 1, 1955, Serial No. 498,522

3 Claims. (Cl. 116—37)

The present inventive improvements relate, broadly, to conveyances, particularly road vehicles, whether automotive or otherwise propelled. More specifically, the invention is concerned with safety means of the warning or notifying type—for automatically signalling to rearwardly-following traffic the imminence of a diminution in the pace of the vehicle bearing the signalling device, so that the following traffic will maintain proper distance rearwardly of the vehicle until, with acceleration of pace of the carrier, the warning signal is no longer rendered. To an extent, therefore, the invention has to do, in effect, with safety devices for maintaining traffic at a safe distance to the rear of a vehicle carrying the article of subject invention.

Manifold types and constructions of such devices have hitherto been proposed and some of these proposals, particularly those employing electrical motivating and indicating means, have become standard equipment on automobiles or standard inventory items in retail accessory outlets.

However, for one or another of the reasons hereinafter set forth, the cost of production of such devices has heretofore been such as to preclude their being standardized except on the higher-priced cars or in the largest chain-type accessory outlets.

Among the reasons aforementioned is the fact that the electrical components and circuitry of these signalling devices require less than infrequent servicing and maintenance attention and if not received, are not completely reliable. The conventional mechanical species of this item involves rather a considerable number of moving parts prone to wear-out, bind or break, because of the rather severe service conditions imposed by the operation of the carrying vehicle.

However, even on cars where they are standard equipment, these prior warning or signalling devices have to be located so low down on the fender or bumper or the like that they are not readily visible to, and fail to attract the attention of, drivers of cars following closely behind and are none too prominently visible when the following cars are spaced a distance to the rearward.

The concepts and objectives of the present invention provide an inertia-operated, kinetic-energy powered signalling or warning device of the occulting, light-reflective, type for road, and other, vehicles. Thus, for one thing, the device does not attempt to rely upon electricity, or electrically-energized or actuated means, nor hydraulics or hydraulically actuated means in its rule of action, and hence includes no extraneous parts, instead being self-contained. By means of a few simple, efficiently fabricatable mechanical parts arranged to employ inertia-generated forces in combination with means for transforming these forces into kinetic energy and applying same, the construction of the device is reduced close to the minimum possible number of moving and other parts, none of which lie outside the confines of the article itself.

The inertia-responsive means, the inertia-transforming means and the occulting, or protractable and retractable reflective-type indicator component are quite compactly interrelated and the mechanisms are of such a nature as to render the device self-sufficient and self-contained. It is therefore quite devoid of and independent of the usual extraneous auxiliaries, such as wiring, batteries, motors etc., and includes no adjuncts or extensions.

In that one of the numerous feasible embodiments of the inventive concepts which is at present the preferred one, the general configuration essentially includes an upright, elongate hollow cylindric casing having a longitudinally extending view aperture on its rear face; an arcuate or semi-cylindric, protractable and retractable index-member disposed concentrically upright in the rear part of the casing in rotary condition; a complemental semi-cylindric fulcrum, or support, member for same disposed upright in fixed or stationary condition in the front half of the casing; an inverted pendulum mounted upright on the vertical axis of the casing on a horizontal axle carried by the fixed semi-cylinder; and means interengaging the pendulum's lower end and the rotatable semi-cylinder. The latter bears a warning or guiding inscription, such as "Stop," "Slow" or any other suitable inscription arranged vertically alongside its outer vertical edge, and adapted, on occasion, to register with the elongate view-aperture.

Thus, when the car is proceeding at its normal rate, the pendulum-bob occupies its rearward position and the interengagement is such that at this juncture the signal is occulted or obscured, being in retracted position, and lying out of the view-aperture. When the car deaccelerates, the inertia of the pendulum-bob displaces the pendulum rearwardly, resulting in protraction of the index-carrying semi-cylinder interengaged therewith, the forces and mechanism actuated thereby urging the word "Stop" or analogue into plain view in the view aperture.

The cylindric, or domed article is provided with a vacuum cup attachment means on its base, by which the article may be mounted upright in any desired position on or in the car. Consequently, it may always be mounted on a surface lying at such elevation above the road as to render it visible at all times to following traffic, contrary to present practice as to "Stop" signals on those cars which have to be provided with such signals at low elevations on the bumpers, fender-ends or the like. The present device can even be mounted atop the rear window ledge and will be clearly visible from the rear and yet is easy of access for securing attention.

The exterior of the article may, of course, be finished in any one of a series of colors that harmonize with current car-colors. The word "Stop," or the like may be provided by decalcomania colors corresponding to those approved by the various State and National safety codes.

The parts and their combination are such as to entail the minimum amount of friction, drag, tolerances-observance and clearance maintenance and can be satisfactorily quantity-produced rapidly of some inexpensive but durable material, such as a suitable organic synthetic plastic, thus contributing in a great measure towards large-scale production and low-price retailing.

Mainly in order to render the nature and characteristics of the invention more concrete, thereby facilitate further understanding of the essence and concepts of this invention, a typical exemplar of the numerous embodiments they may assume is pictorially represented in the accompanying drawings and will be described hereinafter in detail, part by part, in conjunction with said drawings. It is to be definitely understood, however, that these drawings and said description are exemplificatory and typical, merely, and in no wise constitute the definitive form of construction for embodying forth the principles of the invention. The latter may be any of those forms which are defined, in terms of essential structural syntheses for realizing same, in the sub-joined claims of invention.

In said drawings,

Figure 1 is a perspective view of the present article as mounted in one of the many contemplated loci on a road vehicle, the latter being depicted fragmentarily in phantom;

Figure 2 is a rear view, enlarged, of the article in demounted condition and with the visual-indicator component in its protracted position to signal rearwardly following traffic;

Figure 3 is a vertical, substantially central section of the article, taken on line 3—3 of Figure 2, sighting in the direction of the arrows;

Figure 4 is a cross-section of the article taken on line 4—4 of Figure 3 and sighting in the direction of the arrows; the article having been rotated 90° from its Figure 3 position, the view illustrating the position of the moving parts in the protracted condition of the visual-indicator, the vehicle being in motion;

Figure 5 is an enlarged fragmentary detail of the construction shown in longitudinal section in Figure 3, the view being taken along line 5—5 of Figure 4 to illustrate more perceivably the pendulum position with the car proceeding normally and also showing interengagement of the two moving parts of the article, the view not having been rotated 90° about its vertical axis as in Figure 4;

Figure 6 is a transverse, or cross, section of the article taken on substantially the same line, and sighting in the same direction, as for Figure 4, with the article in rotated position as in Figure 4, and depicting the moving parts in the position which they occupy when the visual indicator is in its retracted, invisible position, the vehicle being in full motion;

Figure 7 is an enlarged fragmentary longitudinal-sectional detail, taken on line 7—7 of Figure 6, of a lower portion of the article to illustrate still more clearly the visual-indicator in the retracted and invisible position it occupies when the vehicle is at its greater than minimum velocity;

Figure 8 is a fragmentary longitudinal-sectional detail, taken in a plane at right angles to that of Figure 7 and on line 8—8 of Figure 6, and showing a lower portion of the article for the purpose of viewing the respective hinge-points and the interengagement of moving parts, from another, and clarifying, angle, and Figure 9 is a top plan detail view of the protractably and retractably inertia-movable semi-cylindric visual-indicator member of the article with its operated lug or detent, being demounted for purposes of clarity of representation.

The typical configuration of the article 10 depicted in the drawings as detachably mounted atop a car 11 generally comprises a casing group, sub-assembly, or sub-combination A, an attachment-group or mounting group B, an occulting visual-signaller or indicator group C and an inertia-responsive actuator group D, arranged mutually and combined according to novel concepts to effectuate the present novel rule-of-action.

Group A consists essentially of an upright hollow and rigid but light casing 12 representationally shown, by way of example, as a hollow, elongate right-cylinder, open at its base and spheric or domed at its top; and an elongate rectangular view aperture 13 therein on its rear face. It may well consist of a single, monolithic expanse of a suitable opaque, light organic synthetic plastic, such as Vinylite, methyl methacrylate, polyvinyl butyral or the like and may be cast, extruded or fabricated otherwise.

The mounting group B essentially comprises a vacuum-actuated cup or suction disk 14 or the like, which may well be composed of a suitably yieldable rubber, such as sponge rubber or its synthetic equivalent. The member 14 is detachably attached at its center to the bottom face of the base of the article by means of a washered machine screw 15 or its equivalent. But little downward attaching manual pressure on the casing is requisite to securely but removably attach the cup and the article to either a planate or a warped surface of the car. The latter surface may, in addition to the roof surface shown as a base for the article, equally well include the upper surface of a mudguard, of a trunk-compartment or, perhaps preferably, the ledge of the rear window.

The visual-signalling group C, separately considered comprises a rotary index group 16 protractable and retractable with respect to the congruent elongate aperture 13 extending longitudinally of the rear face of the casing of the article. For combination with an upright cylindric casing, the index group 16 may well include a partially cylindric, or semi-cylindrical, upright rigid member 17 and a reflective-inscription 18. Part 17 is adapted to be pivotally mounted to oscillate intermittently about its vertical axis, being movable into and out of view with respect to the view-aperture 13 by simple but unique inertia-responsive means as hereinafter disclosed.

On othe outer, or exposed, face of the semi-cylindric member 17 is disposed a reflective-light inscription 18 which is here shown as defining the warning word "Stop," but which may well consist of any desired signal, such as "Slow," "Turn," or the like. In any event, it is contemplated that the words be spelled out in a quite luminescent material, brilliantly visible either by reflected light or by phosphorescence or fluorescence. Thus, the letters may be composed of any suitable well-known luminescent paint permissibly containing pulverized glass or the like; of a "sulphide" paint, or any suitable equivalent. Preferably, it is also visible at night.

The index member 17 is oscillatably mounted for protraction and retraction by means including a complementary semi-cylindric member 19 constituting, also, the abutment means for supporting the casing and the attaching cup for the article. Both the index member 17 and its complementary member 19 each include respective horizontal extending partitions or webs. The member 17 includes a pair of parallel, vertically spaced quadrant-like arms 22 integral with the arcuate periphery of the index member 17. The member 19 includes a pair 23 consisting of parallel vertically spaced substantially semi-circular segments integral with member 19 and arranged to overlap the inner ends of arms 22 in such manner as to enable index member 17 to be pivotally supported by unit 19.

Units 17 and 19 may well be composed of some suitable light metallic alloy, such as Alclad or Dow metal, in which case the quadrantal arms and semicircular webs are pivotally interconnected by means of metallic rivets 26 so upset as to leave a certain amount of radial clearance between same and their seating apertures in the arms and webs, thereby to permit rotation. In the case where units 17 and 19 are composed of a suitable organic synthetic plastic, the rivets 26 will suitably be of the well known "plastic" type, this configuration and composition thereby contributing materially to the weight-saving objective of the invention. Also in the latter case, a metallic machine screw 40 may be employed to unite the casing to the member 19. If, however, all parts be composed of a suitable plastic, these two components may be cemented, or otherwise suitably bonded, together.

The inertia-responsive actuator group D consists essentially of an inverted pendulum-unit 30, disposed substantially vertically in the casing and oscillatably mounted on horizontally extending axle means 31 located on center with the lower portion of the vertical axis of the article.

Pendulum-unit 30 consists of a massive head 32 of any suitable conformation and of a mass so proportioned to that of the index unit 17 and taking friction, radius of gyration and moment of inertia into account, as to respond to a predetermined deacceleration rate of the car sufficiently to rather quickly shift the signal from obscured, to visible, position. Unit 30 also includes a shank 34, a hub 35, and a yoke or eye, 36. Hub 35 is adapted to be rotatively engaged with an ear 37 projecting upwardly from the upper face of the stationary hemi-cylindric member 19 by means of a double diameter, or stepped, double-headed pivot-rivet, or the like, 38.

The yoke portion 36 depends below the upper quadrantal member of index unit 17 and swings with the pendulum unit back and forth in a vertical plane that extends well forwardly and rearwardly. It is thus adapted to interengage with a lug, detent or the like 39 that projects horizontally and radially from the hub of the upper quadrantal member of index unit 17, so as to effect rotation of unit 17 about its own vertical axis from obscured to visible position, unit 19 of course remaining stationary.

When the pendulum bob, or head, is inertia-swung to the right, as by proper de-acceleration of the car, viewing Figures 3 and 5 the eye or yoke of course moves to the left urging detent 39 to the left and therefore rotating index unit 17, as shown in Figure 4, counter clockwise into the view aperture, this protraction action occurring at predetermined low velocities of the car. Conversely, when the bob is inertia-swung to the left, which occurs when the car resumes speed, the reverse action occurs and the index is rotated to occulted, obscured, retracted position and this event transpires whenever the car accelerates to a speed above a predetermined minimum.

In the usage of the article, when the carrying vehicle is proceeding normally, that is, at a velocity above a predetermined minimum, the "Stop" legend is invisible, because then the pendulum bob occupies its leftward, or rearward position in the casing, therefore effecting rightward or forward positioning of the yoke with consequent clockwise biasing of the index unit 17 into retracted, invisible position. As soon as this minimum velocity drops, however, and the momentum of the car diminishes, inertia acting upon the pendulum bob urges it forwardly, or rightwardly, viewing Figure 3, resulting in protraction of the visual index, which remains visible and effective until the aforesaid predetermined minimum velocity of the car is established.

There being but two moving parts and motivating energy being supplied by the simple mechanical force of inertia, operation is reliable and upkeep and maintenance work are of rare occurrence. Frictional difficulty and wear due thereto, are almost at the minimum feasible. Breakage or mutilation under normal conditions are of small likelihood as there is no reason precluding making respective parts of substandard dimensions and rugged durable material. None of the parts is "delicate" or critical in nature, and tolerances and clearances do not require rigorous preservation.

It is of course contemplated as lying within the scope of the inventive concepts to cause, if desired, the inertia-responsive actuator to close a switch in an electrical circuit for illuminating and de-illuminating an electric sign or signal mounted in the view aperture, and numerous other modifications, ramifications and refinements of the specific design are well within the purview of the present inventive concepts.

Although in describing a typical embodiment of the invention certain components have, for the sake of concreteness, been identified by specific illustrative shapes, locations, compositions, proportions, finishes, etc., and by means of certain typical mechanical movements, mechanisms and kinematic characteristics it is to be definitely understood that such specificness in no manner constrains their mandatory employment nor by any means confines and limits the scope and range of the invention itself to these particular parameters. On the contrary, in point of fact, and at law, the ambit and essence of the invention is as defined by a proper juristic determination of the metes and bounds of the sub-joined claims of invention.

Having, thus, set forth the nature, attainments and typical configuration of our invention, what we claim as new, inventive and useful and hereby secure as our property is:

1. A new article of manufacture, comprising: a hollow cylindric normally upright casing domed at its upper end and open at its lower end and having an elongate view-opening extending longitudinally in its rear face; a semi-cylindric indicium bearing member mounted in upright attitude adjacent said opening for oscillation about its vertical axis so as to position said indicium into and out of said opening; a pendulum disposed in inverted attitude on the longitudinal center-line of said casing; an axle for said pendulum extending horizontally of the casing; a semi-cylindric member, complementary to the first-said such member, mounted coaxially in the forward portion of the lower region of said casing; an ear projecting substantially upright from the upper surface of said complementary semi-cylindric member along the vertical central plane thereof and adapted to rotatably support said axle; a lug projecting radially and substantially horizontally from the inner region of said indicium bearing semi-cylindric member; and an eye-portion on the lower end of said pendulum embracing and interengaging with said lug so as to occasionally oscillate said indicium-bearing member in those directions which respectively position said indicium in view in said opening and occultate it with respect to said opening.

2. A light-reflective traffic-warning means for vehicles, comprising: a hollow cylindric casing adapted to be mounted upright on a vehicle at an elevation sufficient to render it visible to closely rearwardly following traffic; means for mounting said casing in said attitude and location on said vehicle; said casing having a view-aperture extending longitudinally in its rear face; a semi-cylindric member rotatably disposed coaxially in said casing in adjacency to said opening, said member having a light-reflective indicium on its rear face and having a pair of vertically spaced arms extending forwardly therefrom in substantial parallelism; a complemental semi-cylindric member fixedly disposed coaxially in the forward portion of said casing, said complemental member having a pair of vertically spaced arms extending in substantial parallelism rearwardly therefrom and into adjacency with the first-said arms; means pivotally uniting the first-said semi-cylindric member to the second-said semi-cylindric member; an ear extending upwardly from the second-said cylindric member near the vertical center line of said casing; a hub on the upper end-portion of said ear; a massive-head pendulum disposed in inverted attitude in said casing and having a yoke at its opposite end; a hub intermediate the yoke and the head; axle means pivotally uniting the two hubs aforesaid; and a horizontal, radially outwardly extending detent on the inner end of the upper one of the arms on said first semi-cylindric member, said yoke operatively encompassing said detent.

3. A device that includes a casing having an upright semi-cylindric member rotatable about its vertical axis and an inertia-responsive pendulum member adapted to effect rotation of said semi-cylindric member, the semi-cylindric member having a front surface conforming facewise to the inner face of the front portion of the casing; a pair of horizontally lying, vertically spaced webs extending rearwardly from said front surface; the lower web constituting the bottom of said casing and the webs bearing vertically extending pivot-means at their rear edge-portions for pivotally bearing said axially rotatable semi-cylindric member in upright attitude rearwardly thereof; the upper web having an ear projecting upwardly therefrom substantially at its vertical center-line and adapted to pivotally support said pendulum member for rotation in the vertical plane of said casing.

References Cited in the file of this patent

UNITED STATES PATENTS

| | | |
|---|---|---|
| 1,239,511 | Olds | Sept. 11, 1917 |
| 1,303,147 | Archibald et al. | May 6, 1919 |
| 1,356,585 | Zadig | Oct. 26, 1920 |
| 1,631,698 | Schick | June 7, 1927 |
| 1,768,010 | Snip | June 24, 1930 |
| 2,113,415 | Wallace | Apr. 5, 1938 |